(12) United States Patent
Sylthe et al.

(10) Patent No.: US 7,843,472 B2
(45) Date of Patent: Nov. 30, 2010

(54) METHOD FOR REQUESTING AND VIEWING AN ATTACHMENT IMAGE ON A PORTABLE ELECTRONIC DEVICE

(75) Inventors: Olav A. Sylthe, Atlanta, GA (US); Dan Dumitru, Atlanta, GA (US); Andrew Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/767,352

(22) Filed: Apr. 26, 2010

(65) Prior Publication Data

US 2010/0235753 A1 Sep. 16, 2010

Related U.S. Application Data

(63) Continuation of application No. 12/371,136, filed on Feb. 13, 2009, now Pat. No. 7,733,356, which is a continuation of application No. 11/395,107, filed on Mar. 31, 2006, now Pat. No. 7,511,723.

(51) Int. Cl.
| | |
|---|---|
| H04M 1/00 | (2006.01) |
| G06F 3/14 | (2006.01) |
| G06F 17/00 | (2006.01) |
| G06F 12/00 | (2006.01) |
| G09G 5/00 | (2006.01) |
| G06T 11/00 | (2006.01) |
| G06K 9/14 | (2006.01) |

(52) U.S. Cl. .................. 345/660; 345/671; 345/619; 345/522; 345/472; 455/556.2; 382/305; 711/100; 711/103; 715/252; 715/800; 715/864; 715/815

(58) Field of Classification Search .................. None
See application file for complete search history.

(56) References Cited

U.S. PATENT DOCUMENTS

| 5,701,500 | A | * | 12/1997 | Ikeo et al. | .................. 715/209 |
| 6,141,270 | A | * | 10/2000 | Casper | .................. 365/201 |
| 6,449,639 | B1 | * | 9/2002 | Blumberg | .................. 709/217 |
| 6,556,217 | B1 | | 4/2003 | Makipaa et al. | |
| 6,915,333 | B2 | | 7/2005 | Delia et al. | |
| 7,038,701 | B2 | | 5/2006 | Niemi | |

(Continued)

*Primary Examiner*—Wesner Sajous
(74) *Attorney, Agent, or Firm*—Eckert Seamans Cherin & Mellott, LLC; Brij K. Agarwal, Esquire

(57) ABSTRACT

A method for viewing a full image of a server stored original attachment on a portable electronic device including: building a graph structure within the server representing a map of the original image, downloading and displaying a re-sized image from the server to the portable electronic device, the original image exceeding an image size limit of the portable electronic device indicative of screen size of the portable electronic device, calculating width and height parameters of the full image, sending a request from the portable electronic device to the server to enlarge the image displayed on the device based on the width and height parameters, the request including the image size limit, retrieving and traversing the graph structure within the server to locate a separate image component constructed for the image size limit, collecting image binary data from the separate image component and modifying the image binary data based on the width and height parameters to create the full image of the original image and downloading the full image of the original image to the portable electronic device.

9 Claims, 7 Drawing Sheets

U.S. PATENT DOCUMENTS

| | | |
|---|---|---|
| 7,072,984 B1 | 7/2006 | Polonsky et al. |
| 7,209,149 B2 | 4/2007 | Jogo |
| 7,242,493 B2 | 7/2007 | Hall et al. |
| 7,536,440 B2 | 5/2009 | Budd et al. |
| 2001/0051007 A1 | 12/2001 | Teshima |
| 2002/0016818 A1 | 2/2002 | Kirani et al. |
| 2002/0062396 A1 | 5/2002 | Kakei et al. |
| 2002/0161796 A1 | 10/2002 | Sylthe |
| 2004/0003117 A1 | 1/2004 | McCoy et al. |
| 2004/0073873 A1 | 4/2004 | Croney et al. |
| 2004/0172453 A1 | 9/2004 | De Mendonca et al. |
| 2004/0183817 A1 | 9/2004 | Kaasila |
| 2005/0128366 A1 | 6/2005 | Cha |
| 2005/0193074 A1 | 9/2005 | Garland |
| 2005/0200610 A1 | 9/2005 | Skantze et al. |
| 2005/0232581 A1 | 10/2005 | Karasawa |
| 2006/0031336 A1 | 2/2006 | Friedman et al. |
| 2006/0055693 A1 | 3/2006 | Sylthe et al. |
| 2006/0056334 A1 | 3/2006 | Yuan et al. |
| 2006/0056604 A1 | 3/2006 | Sylthe et al. |
| 2006/0061550 A1 | 3/2006 | Fateh |
| 2006/0062362 A1 | 3/2006 | Davis |
| 2006/0225001 A1 | 10/2006 | Sylthe et al. |
| 2007/0283247 A1 * | 12/2007 | Brenneman et al. ......... 715/513 |
| 2008/0028335 A1 | 1/2008 | Rohrabaugh et al. |
| 2008/0102887 A1 | 5/2008 | Sylthe et al. |
| 2008/0188304 A1 | 8/2008 | Escalera et al. |
| 2008/0214204 A1 | 9/2008 | Ramer et al. |
| 2008/0316225 A1 | 12/2008 | Sylthe et al. |

* cited by examiner

METHOD FOR REQUESTING AND VIEWING AN ATTACHMENT IMAGE ON A PORTABLE ELECTRONIC DEVICE

RELATED APPLICATIONS

The present application is a continuation of U.S. patent application Ser. No. 12/371,136, filed Feb. 13, 2009 now U.S. Pat. No. 7,733,356, entitled "Method for Requesting and Viewing an Attachment Image on a Portable Electronic Device", which is a continuation of U.S. patent application Ser. No. 11/395,107, filed Mar. 31, 2006, now issued U.S. Pat. No. 7,511,723, also entitled "Method for Requesting and Viewing an Attachment Image on a Portable Electronic Device". The contents of U.S. patent application Ser. Nos. 12/371,136 and 11/395,107 are incorporated herein by reference.

FIELD

The present embodiment relates to displaying attachments on a portable electronic device, in particular, a method for requesting and viewing an attachment image on a portable electronic device.

BACKGROUND

Wireless technology has made it possible for email messages to be received and displayed by various portable electronic devices including Personal Digital Assistants (PDAs), for example. Sending email messages including attachments, such as photographs or scanned documents, is becoming increasingly popular, however, most attachments are formatted for a rich desktop or printer experience and generally require a desktop PC with a large screen display for proper viewing. As such, viewing these attachments on the small screens of most portable electronic devices presents a challenge.

When a user makes a request to view an attachment, the request is received at a server where the attachment is scaled down to fit on the portable electronic device screen and then returned to the portable electronic device. When viewing high resolution attachments such as scanned documents, for example, details of the scaled down image are often difficult to distinguish. In order to view text or other details of the scaled down image, the user may enlarge a desired portion by selecting an appropriate menu option. Each time the user requests enlargement of an area of the scaled down image, the request is sent to the server and a higher resolution image of the selected area is returned to the portable electronic device. Often, the enlargement process must be performed multiple times before the user is able to view the details of the entire scanned document.

BRIEF DESCRIPTION OF THE DRAWINGS

The embodiment will be better understood with reference to the following Figures in which like numerals denote like parts and in which.

DETAILED DESCRIPTION

Figure 1:
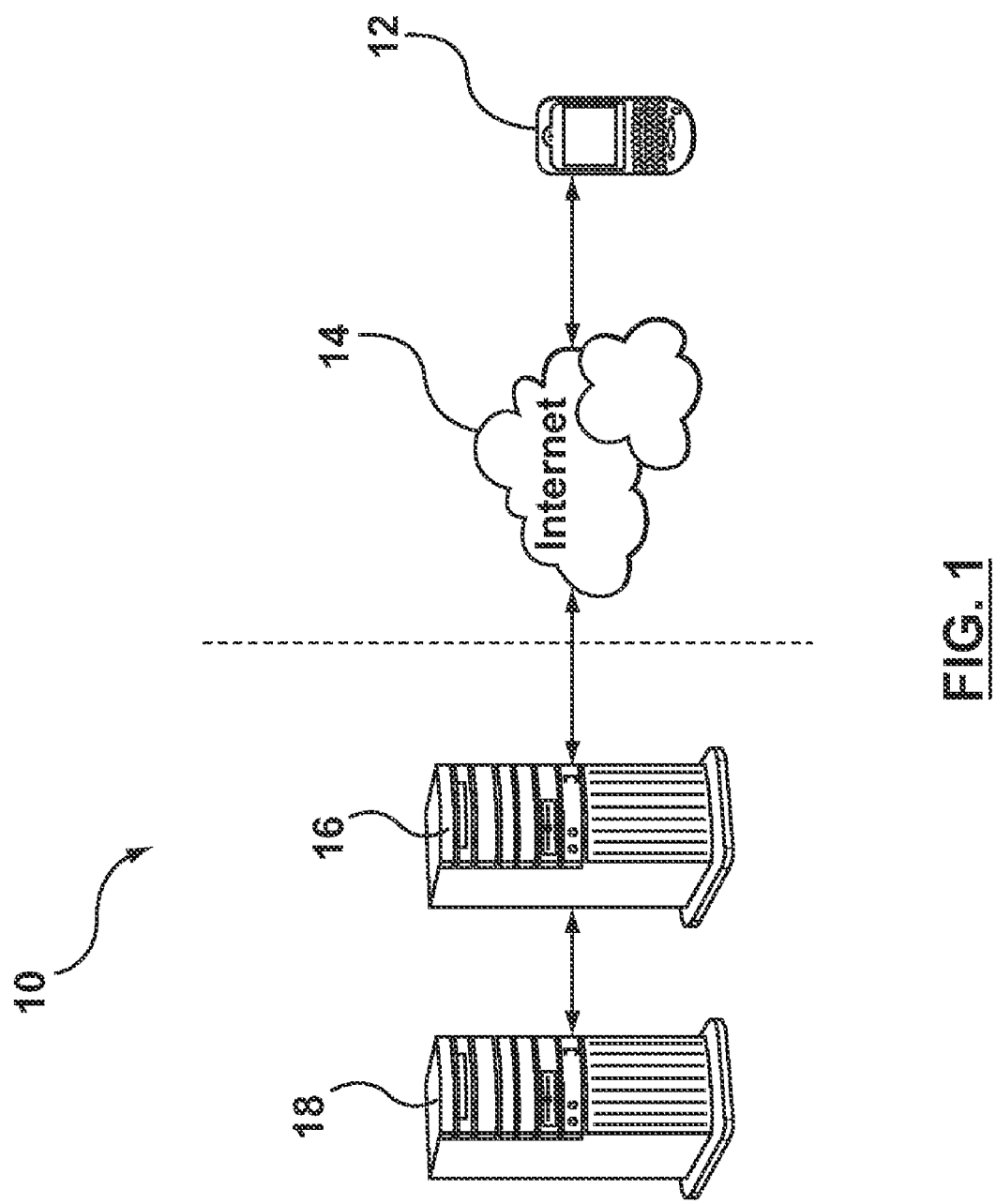
FIG. 1 is a schematic diagram of a wireless communication system.

Referring to FIG. 1, a communication system 10 for a portable electronic device 12 is generally shown. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN Mobitex, DataTAC networks, EDGE or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as an attachment server, which communicates with an email client and an attachment viewer of the portable electronic device 12 to allow a user to view attachments that are received in email messages. While only one server 18 is shown for illustration purposes, a person skilled in the art will understand that the attachment server may alternatively be a separate server.

Figure 2:
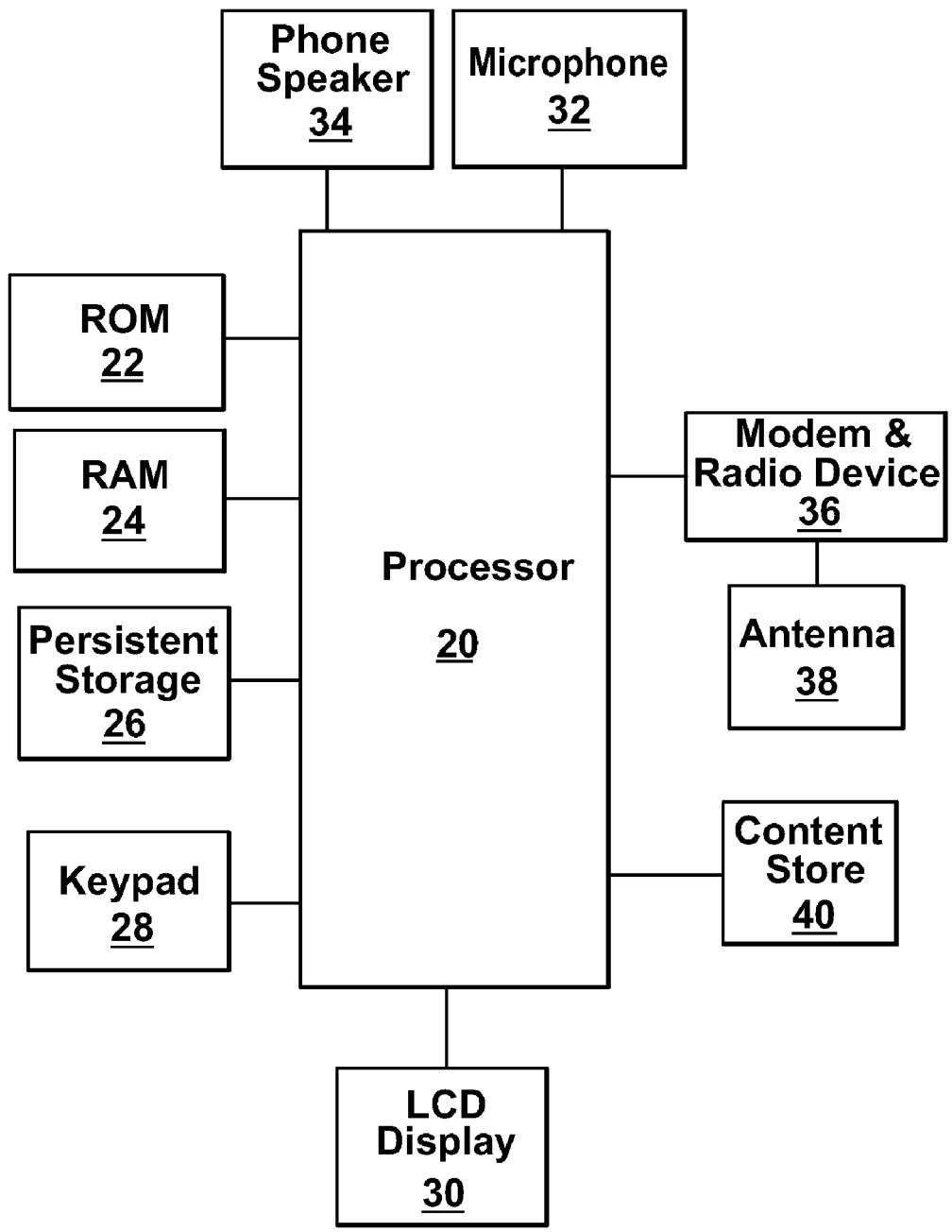
FIG. 2 is a block diagram of components of a portable electronic device according to an embodiment.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

The portable electronic device 12 is based on a microcomputer including a processor 20 connected to a read-only-memory (ROM) 22 that contains a plurality of applications executable by the processor 20 that enables each portable electronic device 12 to perform certain functions including, for example, PIN message functions, SMS message functions and cellular telephone functions. The processor 20 is also connected to a random access memory unit (RAM) 24 and a persistent storage device 26 which are responsible for various non-volatile storage functions of the portable electronic device 12. The processor 20 receives input from various input devices including a keypad 28. The processor 20 outputs to various output devices including an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38. A content store 40, which is generally a file storage system for the portable electronic device 12, is also provided.

Figure 3:
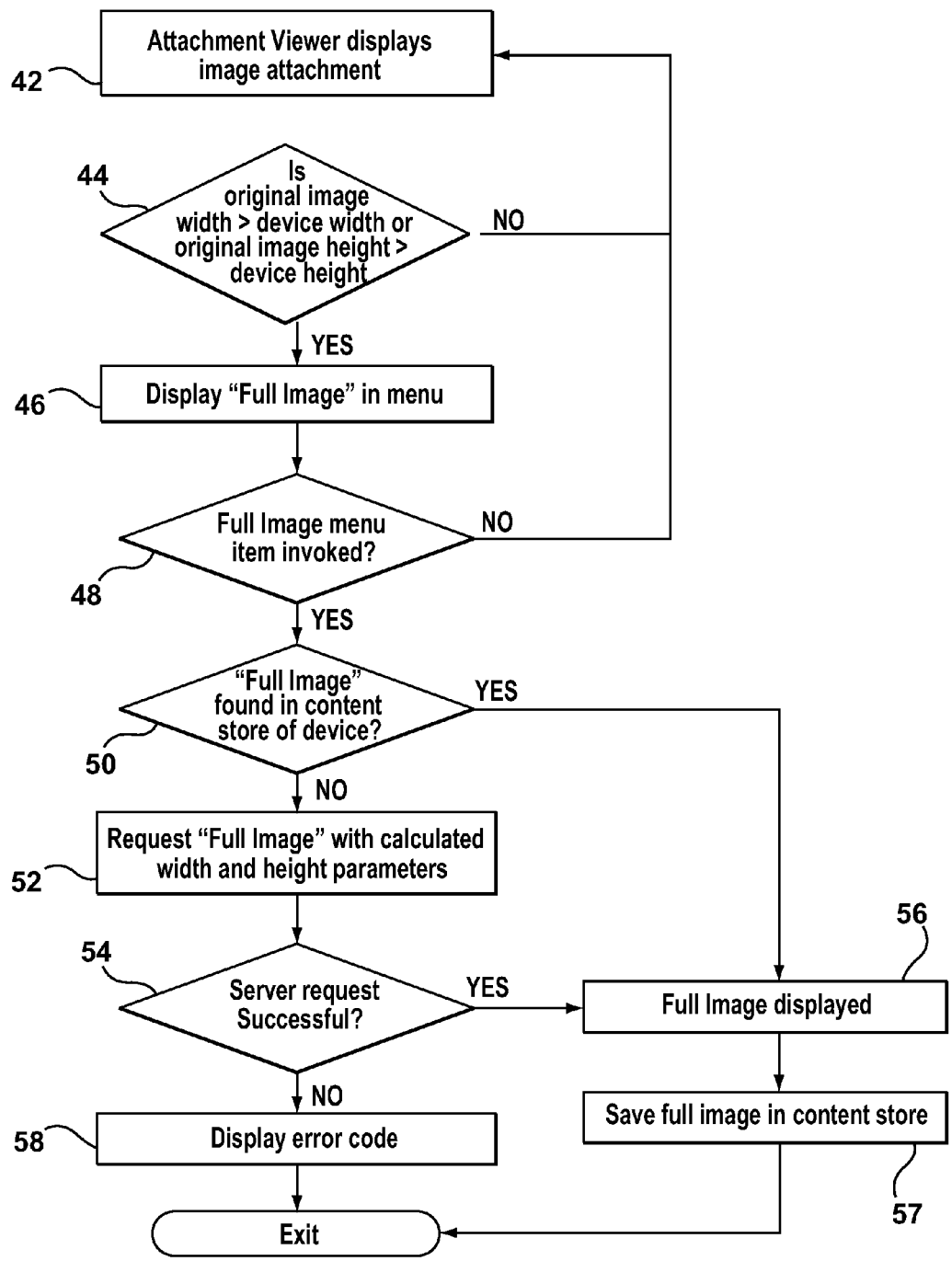
FIG. 3 is a flowchart depicting device side operation for viewing an attachment on the portable electronic device of FIG. 2.
Figure 4:
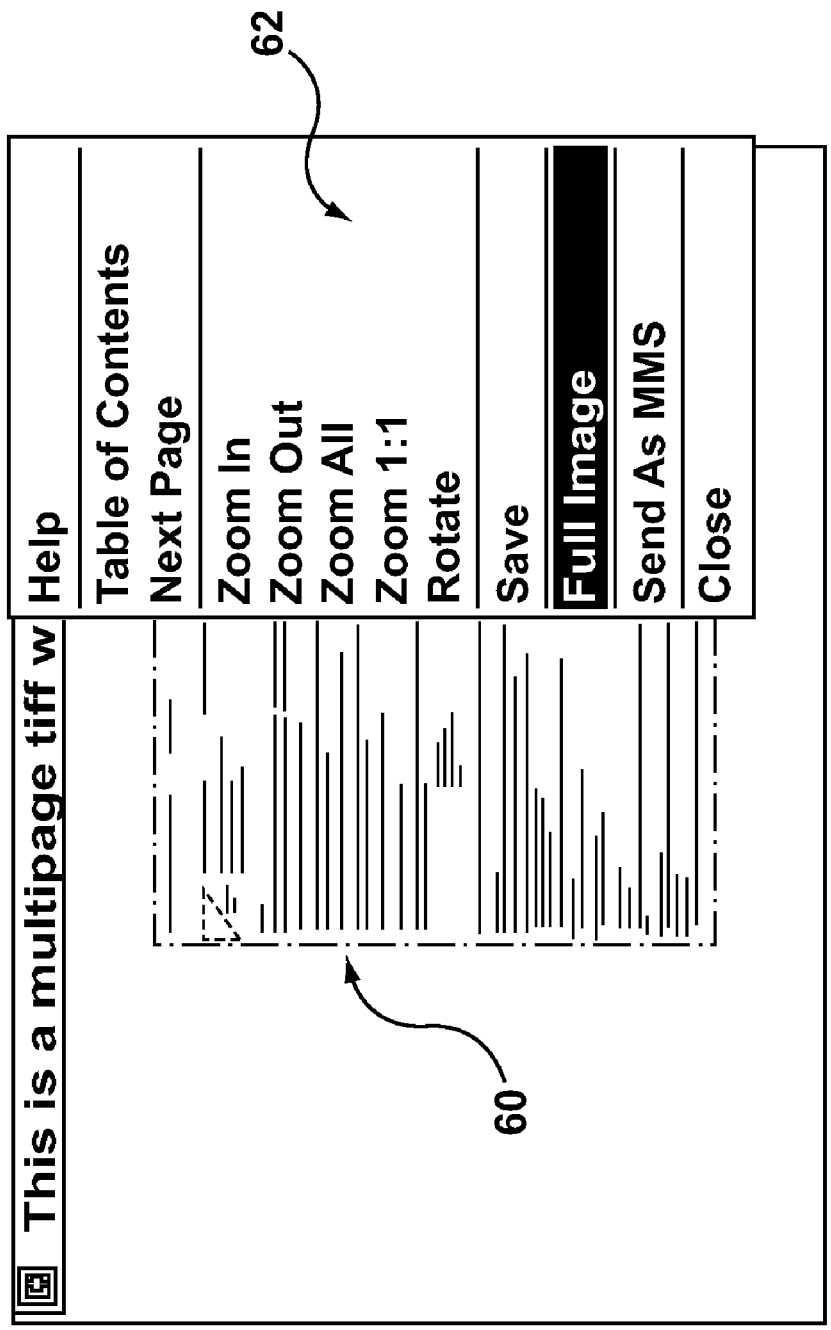
FIG. 4 is a screen shot of the portable electronic device of FIG. 2.

Referring to FIG. 3, a method for viewing an attachment on portable electronic device 12 according to an embodiment is generally shown. First (step 42), the attachment viewer displays a resized image of the attachment on the display 30 of portable electronic device 12. An example of a resized image 60 as it appears on the display 30 is shown in FIG. 4. The resized image 60 corresponds to a first page of a scanned document that the portable electronic device 12 received in an email message in TIFF format. As shown, the text of the resized image 60 is difficult to read due to the small size thereof.

Prior to step 42, the attachment server performs the resize operation on the original image and downloads the resized image to the device 12. In order to perform the resize operation, the attachment server first builds a Document Object Model (DOM) by parsing the attachment document. In this manner, a graph structure is built within the server representing a map of the original image. The original image is then resized based on the requesting device image size limit, or device screen size width and height (in pixels). The DOM structure is disclosed in U.S. Pat. No. 7,451,405, which is herein incorporated by reference.

At step 44, the attachment viewer determines if the original image width is greater than the device display width and/or if the original image height is greater than the device display height. If one or both of the original image width and original image height are greater than the display width and display height, respectively, then the attachment viewer moves to step 46 and displays a "full image" option in an attachment viewer menu 62, which is shown in FIG. 4. If both the width and height of the original image are less than those of the device display, the attachment viewer returns to step 42, the execution logic of FIG. 3 is terminated and the "full image" option does not appear in the attachment viewer menu 62.

As indicated at step 50, if the user invokes the "full image" option from the menu 62 (step 48), the attachment viewer first determines if a full image for the particular attachment was previously requested from the attachment server. Previously requested full images are stored locally on the portable electronic device 12 in the content store 40. Therefore, the attachment viewer searches the content store 40 and if corresponding full image data is available for the requested image, the attachment viewer displays the full image, as indicated at step 56. If no corresponding full image data is found, the attachment viewer requests the "full image" from the attachment server. The request that is sent to the attachment server includes the device screen size as well as calculated width and height parameters, as indicated at step 52. Alternatively, if the user does not invoke the "full image" option, the attachment viewer returns to step 42 and simply continues to display the resized image.

The calculated width and height parameters for the full image are determined as follows. The full image width is equal to 8/3 multiplied by the smaller one of the original image width and the device screen width. The full image height is equal to 8/3 multiplied by the smaller one of the original image height and the device screen height. The aspect ratio of the original image is maintained during the "full image" operation.

If the attachment server successfully resizes the attachment image, the full image is shown on the display 30 of the portable electronic device 12 and saved in the content store 40, as indicated at steps 56 and 57, and the execution logic of FIG. 3 is complete. If the attachment server is unable to execute the "full image" option, an error code is displayed instead, as indicated at step 58.

Figure 5:
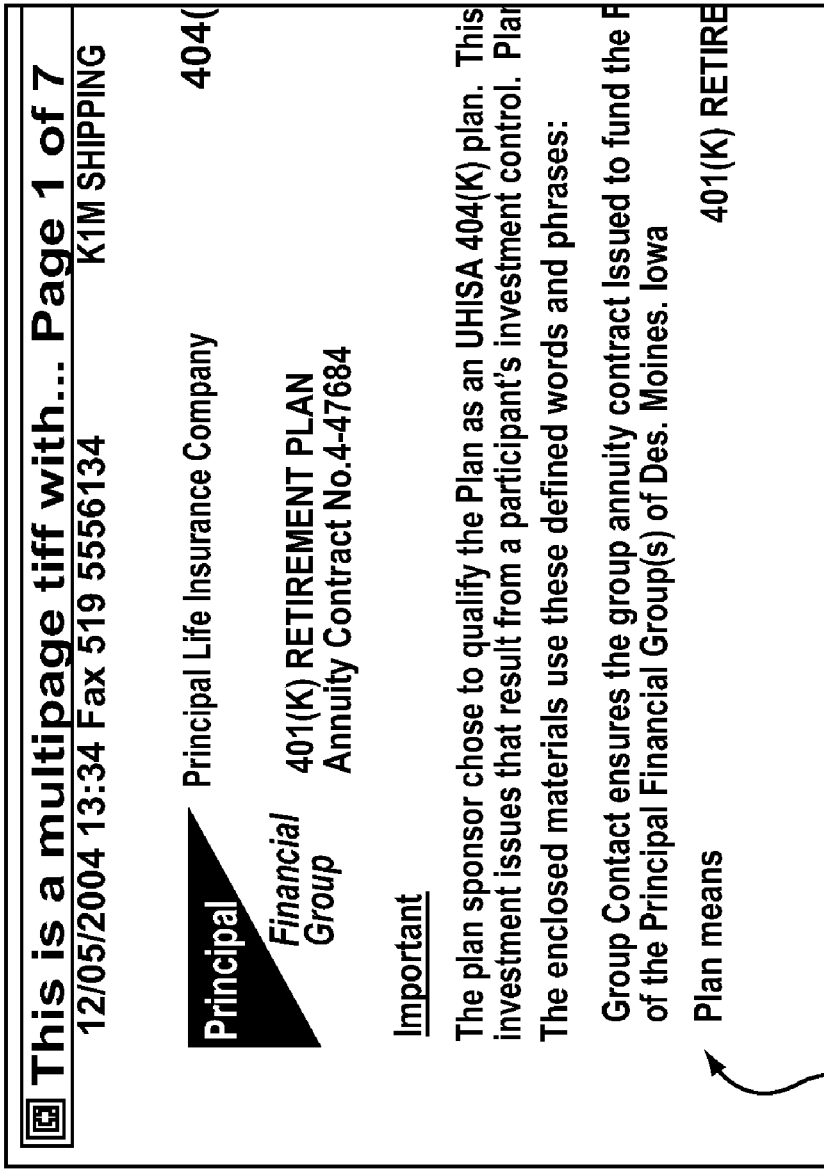
FIG. 5 is another screen shot of the portable electronic device of FIG. 2.

Successful execution of the "full image" option results in an image being returned from the attachment server that is larger and has a higher resolution than the image that is displayed at step 42. An example of a larger, higher resolution full image 64 is shown in FIG. 5. Once the full image has been displayed, image manipulation operations are available to the user. Image manipulation operations include zoom, pan, rotate, enhance and save, for example. These operations are performed in a manner that is known in the art and generally include using a track wheel (not shown) and an arrow key (not shown) of the portable electronic device 12.

Figure 6:
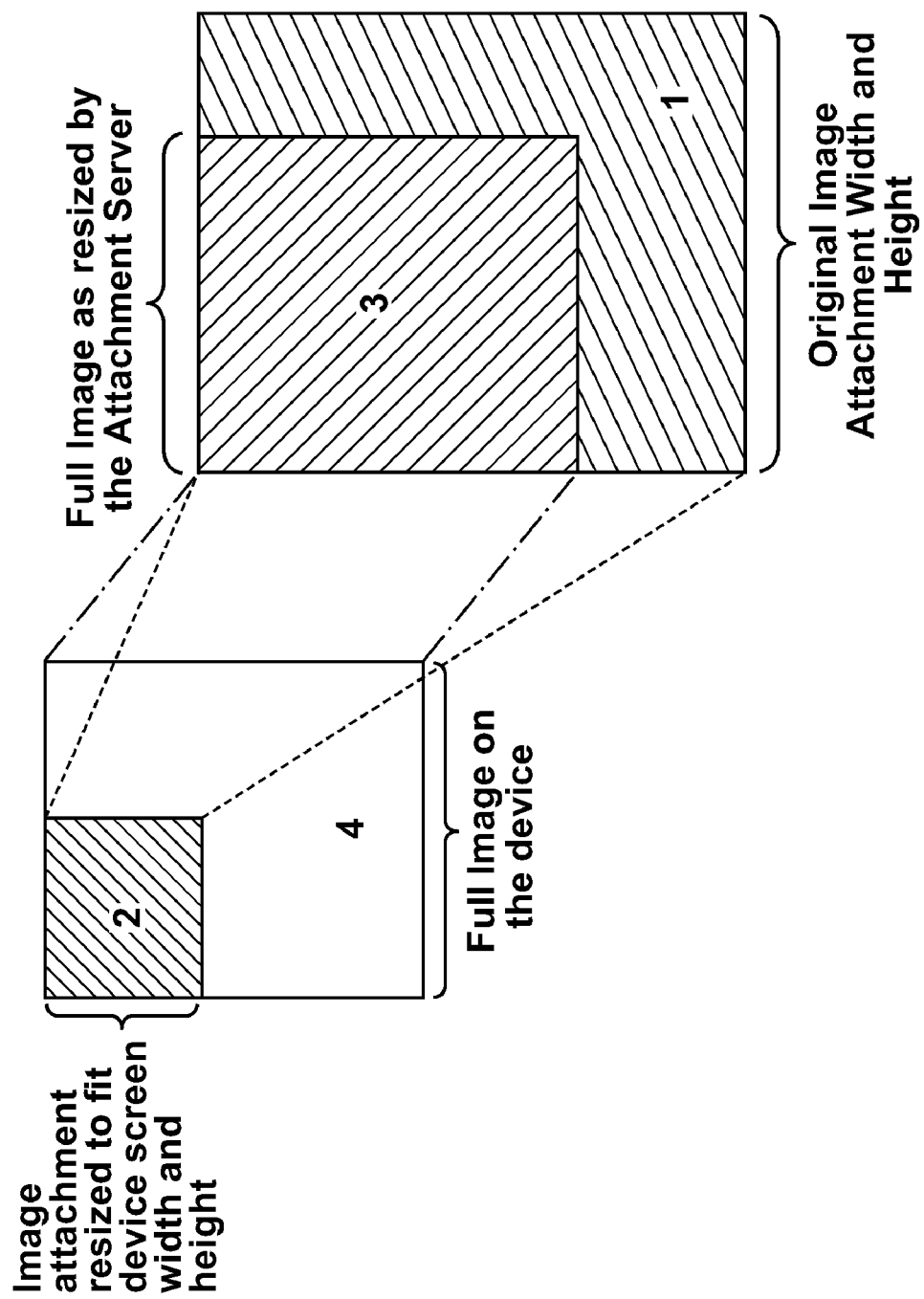
FIG. 6 is a schematic diagram comparing an original image, a screen image and a full image.

The relationship between the original image, the resized image and the full image is generally shown in FIG. 6. Image 1 represents the original image, which is larger than the display 30 and therefore, selection of the "full image" option is possible. Image 2 represents the resized image that is shown on the display 30. Image 3 represents the "full image" after the calculated width and height have been determined and the original image has been resized by the attachment server. Image 3 is sent to the portable electronic device 12 and maintains its size, as indicated by Image 4. The entire "full image" may be viewed by the user by using the various image manipulation operations that are provided on the portable electronic device 12.

Figure 7:
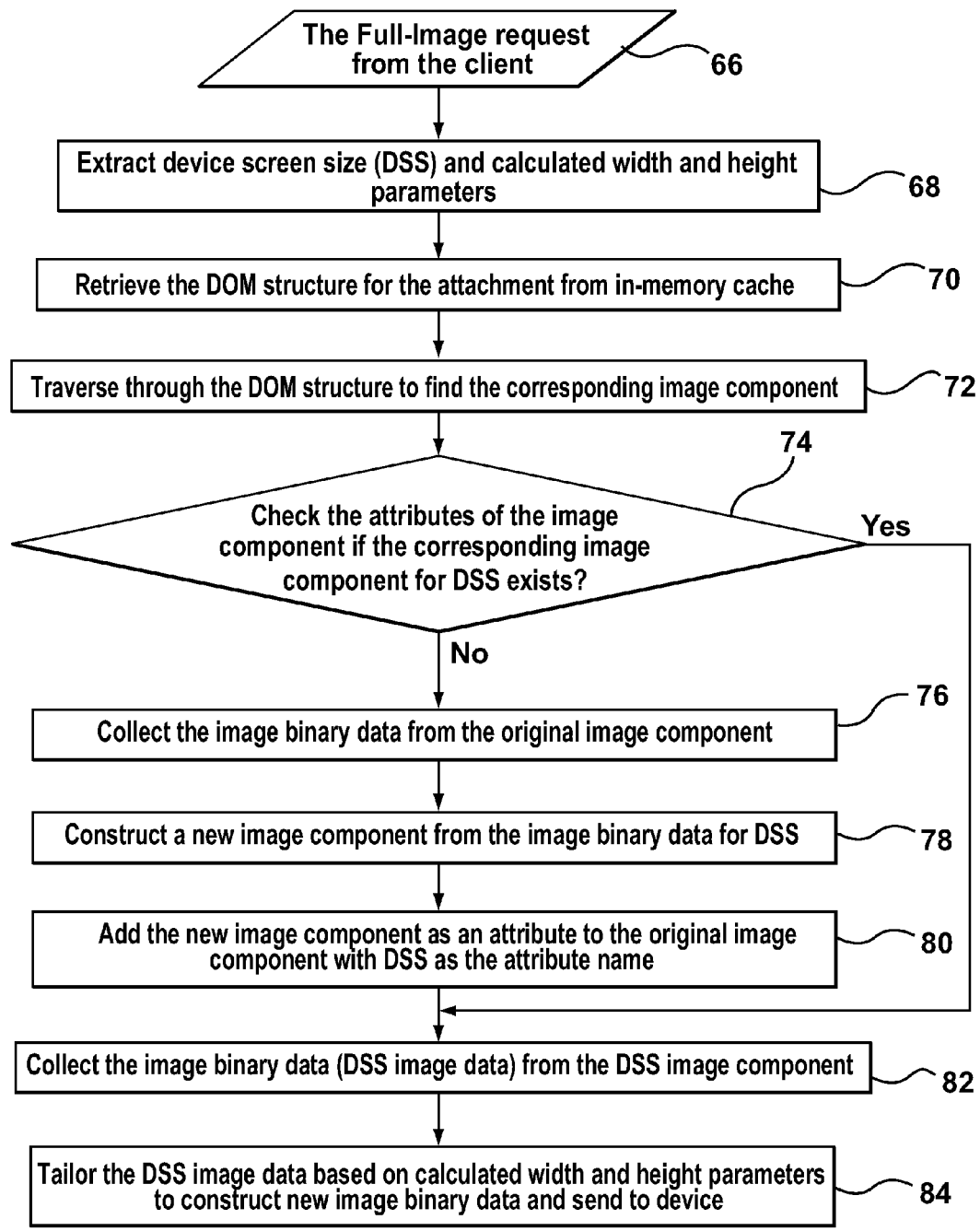
FIG. 7 is a flowchart depicting server side operation for viewing an attachment on the portable electronic device corresponding to the device side flowchart of FIG. 3.

Referring now to FIG. 7, server side operation for the method for viewing an attachment on portable electronic device 12 of FIG. 3 is generally shown. At step 66, the attachment server receives the "Full Image" request from the attachment viewer of the portable electronic device 12. At step 68, the attachment server extracts the device screen size (DSS) and calculated width and height parameters from attachment viewer request. The attachment server then retrieves the DOM structure for the attachment from in-memory document DOM cache, as indicated at step 70. Once the DOM has been retrieved, the attachment server traverses through the DOM structure to determine the corresponding image component in the DOM for that image, as indicated at step 72. At step 74, the attachment server iterates through the attributes of the corresponding image component to determine if a separate image component specifically for that screen size has already been constructed. The separate image component contains the same graphic information as the original image but is usually of a smaller size than the original image (generally less than or equal to the device screen size) and thus consumes much less memory (usually in ratio of 1:15 to 1:20).

If the separate image component does not exist, the attachment server collects the image binary data from the original image component in memory, as indicated at step 76, and constructs a new image component from the binary data, as indicated at step 78. At step 80, the attachment server caches the DSS image component as an attribute of the original image component in the DOM structure. The DSS binary image data is collected at step 82 and then tailored to create new binary image data based on the calculated width and height parameters and the new binary image data is returned to the attachment viewer of the portable electronic device 12, as indicated at step 84.

In operation, the user of the portable electronic device 12 receives an email message having an attachment and opens the attachment in the attachment viewer. The attachment appears as shown in FIG. 4 with details that are difficult for the user to distinguish. If the original attachment image is larger than the display 30 of the portable electronic device 12, the "full image" option is available in the attachment viewer menu 62. The user then selects the "full image" option and if the "full image" option has not been previously requested for this particular image, the attachment viewer sends a request to the attachment server to provide a full image. The attachment viewer request includes width and height parameters that are calculated by the attachment viewer. The attachment server, upon receiving the attachment viewer request, constructs a new image component that corresponds to the full image and returns the full image to the attachment viewer. The full image is then presented on display 30 and saved in the content store 40 of the portable electronic device 12.

A specific embodiment of the present embodiment has been shown and described herein. However, modifications and variations may occur to those skilled in the art. For example, although the portable electronic device 12 has been described having cellular telephone capabilities, the described embodiment is not limited to portable electronic devices having both cellular telephone and email capabilities. A portable electronic device having email capabilities but not cellular telephone capabilities may also be used. All such modifications and variations are believed to be within the sphere and scope of the present embodiment.

What is claimed is:

1. A method for viewing an original image attachment on a portable electronic device having at least a processor, a memory and a display, comprising:

downloading and displaying a re-sized image representing a first page of said original image attachment adapted to fit said display, wherein said re-sized image maintains the same aspect ratio as said original image attachment;

calculating width and height parameters of said original image attachment;

in the event said original image attachment exceeds an image size limit of said display then generating a menu selection on said display for downloading a full size image of said first page of said original image attachment;

in response to activating said menu selection issuing a request to enlarge the re-sized image to said full size image;

displaying said full size image of said first page of said original image attachment, wherein said full size image is larger and has a higher resolution than the re-sized image; and generating a further menu selection for providing image manipulation operations for said full size image.

2. A method as claimed in claim 1, wherein an original image attachment width exceeds a width of said image size limit and an original image height exceeds a height of said image size limit.

3. A method as claimed in claim 1, further comprising storing said full size image in said memory of said portable electronic device.

4. A method as claimed in claim 1, further comprising determining if said full size image has been stored in said memory and if so retrieving said full size image from said memory responsive to issuing said request to enlarge the re-sized image and if not downloading said full size image.

5. A method as claimed in claim 1, wherein said image manipulation operations include at least one of zoom, pan, rotate, enhance and save.

6. A portable electronic device, comprising:

a memory;

a display; and a processor for (i) downloading and displaying a re-sized image representing a first page of an original image attachment adapted to fit said display, wherein said re-sized image maintains the same aspect ratio as said original image attachment, (ii) calculating width and height parameters of said original image attachment; (iii) in the event said original image attachment exceeds an image size limit of said display then generating a menu selection on said display for downloading a full size image of said first page of said original image attachment, (iv) in response to activating said menu selection issuing a request to enlarge the re-sized image to said full size image, (v) displaying said full size image of said first page of said original image attachment, wherein said full size image is larger and has a higher resolution than the re-sized image, and (vi) generating a further menu selection for providing image manipulation operations for said full size image.

7. A portable electronic device as claimed in claim 6, wherein said processor is further adapted to store said full size image in said memory.

8. A portable electronic device as claimed in claim 7, wherein said processor is further adapted to determine if said full size image has been stored in said memory and if so to retrieve said full size image from said memory responsive to issuing said request to enlarge the re-sized image and if not downloading said full size image.

9. A portable electronic device as claimed in claim 6, wherein said image manipulation operations include at least one of zoom, pan, rotate, enhance and save.

* * * * *